INVENTOR.
CHRISTIAAN H.F. VELZEL

United States Patent Office 3,676,006
Patented July 11, 1972

---

3,676,006
METHOD OF MEASURING THE ROUGHNESS OF A SURFACE
Christiaan Hendrik Frans Velzel, Emmasingel, Eindhoven, Netherlands, assignor to U.S. Philips Corporation, New York, N.Y.
Filed Sept. 22, 1969, Ser. No. 859,989
Claims priority, application Netherlands, Sept. 24, 1968, 6813608
Int. Cl. G01b 9/02
U.S. Cl. 356—109                                    2 Claims

ABSTRACT OF THE DISCLOSURE

The invention relates to a method of measuring the roughness of a surface. The invention also relates to an apparatus for carrying out the method.

---

Figure 1:
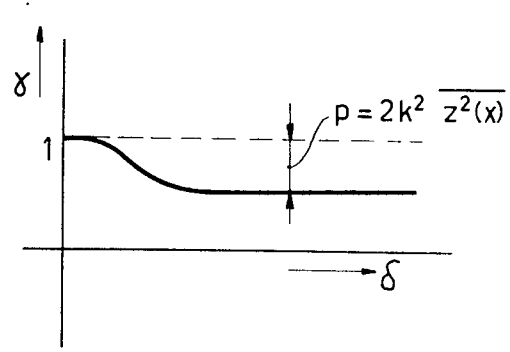

The roughness of a surface can be determined in a variety of ways. In the known methods, the surface is traced point by point. The known methods have the disadvantage that the measuring results must be processed afterwards, for they yield a profile of the surface. From this the roughness has to be calculated.

In many known methods, a mechanical contact is established between the surface and the measuring instrument so that either the surface or the measuring instrument may readily be damaged.

It is an object of the invention to avoid the disadvantages of the known methods. For this purpose, the invention is characterized in that by means of an optical system two images of the surface, which show a phase difference and a displacement relative to one another are superposed.

The invention is based on the recognition that for a substantially flat surface having statistically distributed irregularities the contrast of interferences obtained by waves reflected at the surface depends upon the structure of the surface.

The amplitudes of the two coherent images can be written as $A(x,y)$ and as $e^{i\varphi}A(x-\delta, d)$, where $\delta$ is the displacement of the image in the $x$-direction and $\varphi$ is the phase difference between the amplitudes. The intensities of the two images are equal or substantially equal.

The total intensity of the image in the image plane at the point $x, y$ is:

$$I(x,y) = |A(x,y)|^2 + |A(x-\delta, y)|^2 + 2Re\{A(x,y) A^*(x-\delta, y) e^{-i\varphi}\}$$

The mean intensities $\bar{I}_0$ and $\bar{I}$ for $\varphi=0$ and $\varphi=\pi$ radians, respectively, are measured. Now:

$$\bar{I}_0 - \bar{I}_\pi = 4Re\overline{\{A(x,y) A(x-\delta, y)\}}$$

and $$\bar{I}_0 + \bar{I}_\pi = 2\overline{|A(x,y)|^2} + 2\overline{|A(x-\delta, y)|^2}$$

Since the intensities of the two images are equal, we have $$\bar{I}_0 + \bar{I}_\pi = 4\overline{|A(x,y)|^2} = 4\overline{I(x,y)}$$

The modulation depth $\gamma$ of the intensity is defined by:

$$\gamma = \frac{\bar{I}_0 - \bar{I}_\pi}{\bar{I}_0 + \bar{I}_\pi} = \frac{4Re\overline{\{A(x,y) A(x-\delta, y)\}}}{4\overline{I(x,y)}}$$

$$= \frac{Re\overline{\{A(x,y) A(x-\delta, y)\}}}{\overline{I(x,y)}}$$

(The modulation depth is obtained by modulating $\varphi$ between $\varphi=0$ and $\varphi=\pi$ radians.)

For a phase object, i.e. an object which adds only spatial phase variations to the wave front reflected at it, we have:

$$\gamma = \overline{\cos \psi}$$

where $\psi$ is the phase angle of $$A(x,y) A\left(x \mid -\delta, y\right)$$

When the phase angle $\psi$ is small, then in approximation:

$$\gamma = 1 - \tfrac{1}{2}\overline{\psi^2}$$

If $\psi$ is considered to be produced by the displacement over itself of a surface which has irregularities the radius of curvature of which is large compared with the wavelength $\lambda$ of the incident radiation, which irregularities are given by: $z=z(x,y)$, where $\bar{z}=0$, then (with $k=2\pi/\lambda$)

$$\psi = k\{z(x,y) - z(x-\delta, y)\}$$

so that $$\overline{\psi^2} = 2k^2\{\overline{z^2(x,y)} - \overline{z(x,y) z(x-\delta, y)}\}$$

In the latter formula the term $$k^2\overline{z^2(x,y)}$$

is a measure of the unevenness of the surface and the term $$k^2\overline{z(x,y) z(x-\delta, y)}$$

is the autocorrelation of the irregularities.

In FIG. 1, $\gamma$ is plotted as a function of $\delta$ for a weakly modulated phase object. With increasing values of $\delta$, $\gamma$ converges to a constant value. The difference between $\gamma=1$ (for $\delta=0$), and $\gamma$ for $\delta=$large is $$2k^2\overline{z^2(x,y)}$$

(denoted by $p$ in the figure).

The invention will be described more fully, by way of example, with reference to FIG. 2, which shows an embodiment of an apparatus for carrying out the method according to the invention.

Figure 2:
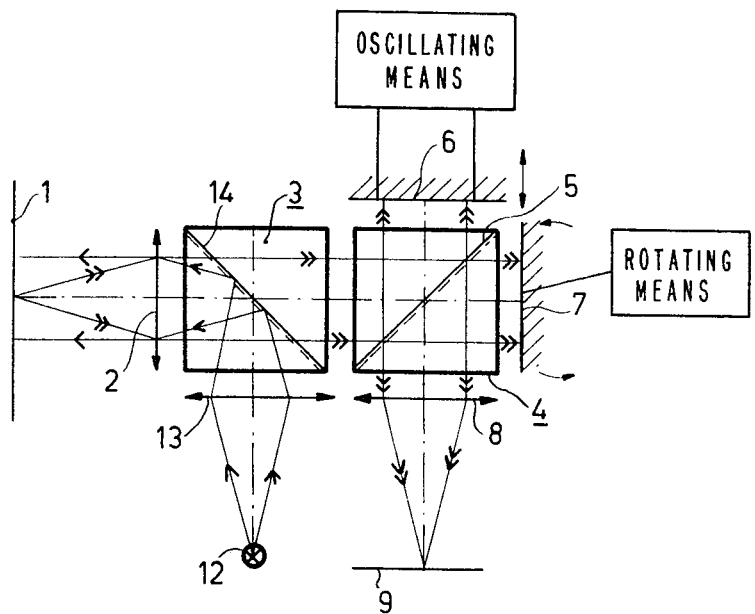

In FIG. 2, reference numeral 1 denotes the object having irregularities, for example, a fairly well-polished silicon wafer to be used as the initial material in the manufacture of integrated circuits. Radiation emanating from a source 12 of coherent radiation, for example a mercury vapour lamp, is projected onto a prism 3 through a condenser lens 13. The beam of radiation is reflected at a half-silvered beam-splitting mirror 14 provided in the prism 3. The beam impinges on the object 1 through a lens 2. The condenser lens 13 ensures that the radiation impinges at right angles on the object 1, which is disposed in the focal plane of the lens 2. The radiation reflected at the object 1 is converted by the lens 2 into a collimated beam which through the prism 3 impinges on a prism 4.

At a half-silvered beam-splitting mirror 5 provided in the prism 4 the beam of radiation is divided into two sub-beams. One sub-beam is reflected towards a plane mirror 6, the other sub-beam is transmitted to a plane mirror 7. The sub-beams are reflected at the mirrors 6 and 7, and images of them are produced by way of the half-silvered mirror 5 and a lens 8 in an image plane 9. The mirror 6 performs an oscillating movement in the direction of the optical axis with an amplitude of at least ¼λ. The amplitude of the alternating-voltage signal produced in a detector disposed in the image plane 9 is proportional to $\gamma$. The mirror 7 is adjusted so that a maximum value of the amplitude is obtained.

By rotation of the mirror 7, which is arranged for rotation about an axis at right angles to the optical axis, $\gamma$ is found as a function of $\delta$.

By means of this method irregularities in a surface of the order of a few nanometers, ($10^{-9}$ meters) can be determined. The correlation length of the irregularities must be at least equal to several times the wavelength of the radiation incident on the surface. When the correlation length is large, the power of the lenses 2 and 8 may be adapted so as to produce a reduced image of the object.

What is claimed is:

1. An apparatus for measuring the roughness of a surface, comprising means for projecting a collimated beam of radiation from the rough surface, half-silvered mirror means in the path of the radiation beam for splitting the beam into a first and a second sub-beam, a second mirror having a surface in the path of the first sub-beam and perpendicular thereto, the second mirror movable in a direction parallel to the impinging first sub-beam, a third mirror in the path of the second sub-beam mounted for pivotal rotation on an axis perpendicular to the direction of the second sub-beam, the second and third mirrors oriented to reflect impinging radiation back to the beam splitter means for combining the sub-beams, and means for projecting the combined sub-beams onto a second surface, whereby displacement of the second mirror permits introduction of a phase displacement between the sub-beams, and whereby the rotation of the third mirror displaces the image formed from the second sub-beam with respect to the image formed from the first beam.

2. A method of measuring the roughness of a surface, comprising projecting an image of a portion of the surface onto a second surface through a path including a mirror, projecting a second image of the same portion of the first surface onto the second surface in interfering relationship with the first image through a path including a second mirror, moving the first mirror in a direction parallel to the light reflected from the first mirror whereby a phase displacement between the first image and second image is introduced, measuring the light intensity in the region of interference of the images before and after the phase shift, rotating the second mirror about an axis perpendicular to the light impinging on the second mirror whereby the second image is displaced with respect to the first images along the plane of the second surface, and repeating the steps of moving the first mirror and measuring the light intensity until the modulation depth becomes independent of displacement of the two images on the second surface.

References Cited

UNITED STATES PATENTS

| | | | |
|---|---|---|---|
| 3,286,582 | 11/1966 | Mertz | 356—106 |
| 3,395,608 | 8/1968 | Neill | 356—109 X |
| 2,878,722 | 3/1955 | Hopkins et al. | 356—109 |

OTHER REFERENCES

Munnerlyn, C. R. et al. "Rough Surface Interferometry Using a $CO_2$ Laser Source," Applied Optics, vol. 7, No. 9, September 1968, p. A1, 1858–1859. Received in Patent Office on Sept. 17, 1968.

RONALD L. WIBERT, Primary Examiner

C. CLARK, Assistant Examiner